Feb. 16, 1926.

L. A. DREY 1,573,636

APPARATUS FOR FEEDING GLASS INTO MOLDS

Filed Oct. 18, 1920     5 Sheets-Sheet 3

INVENTOR
LEO A. DREY
By Edward E. Lungen
ATTY.

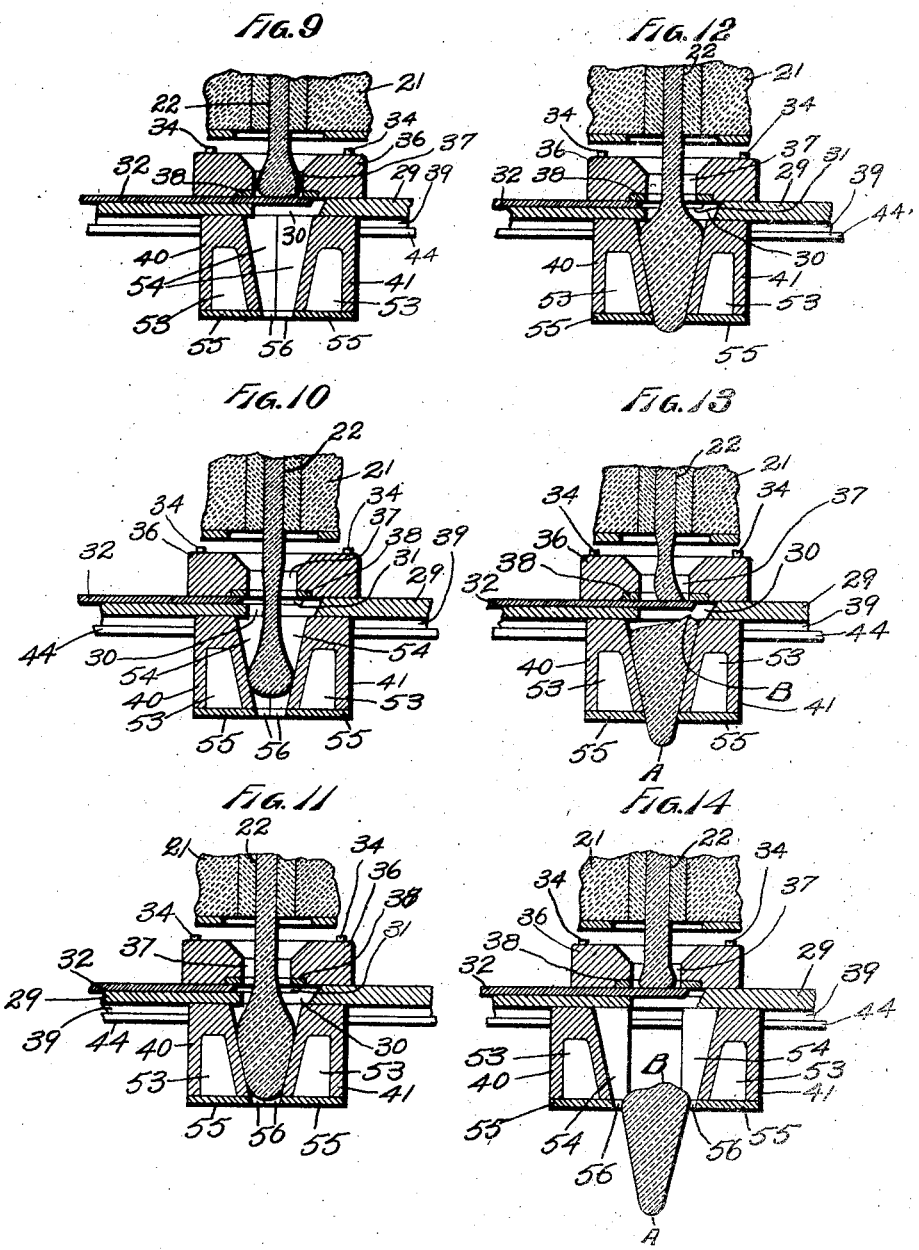

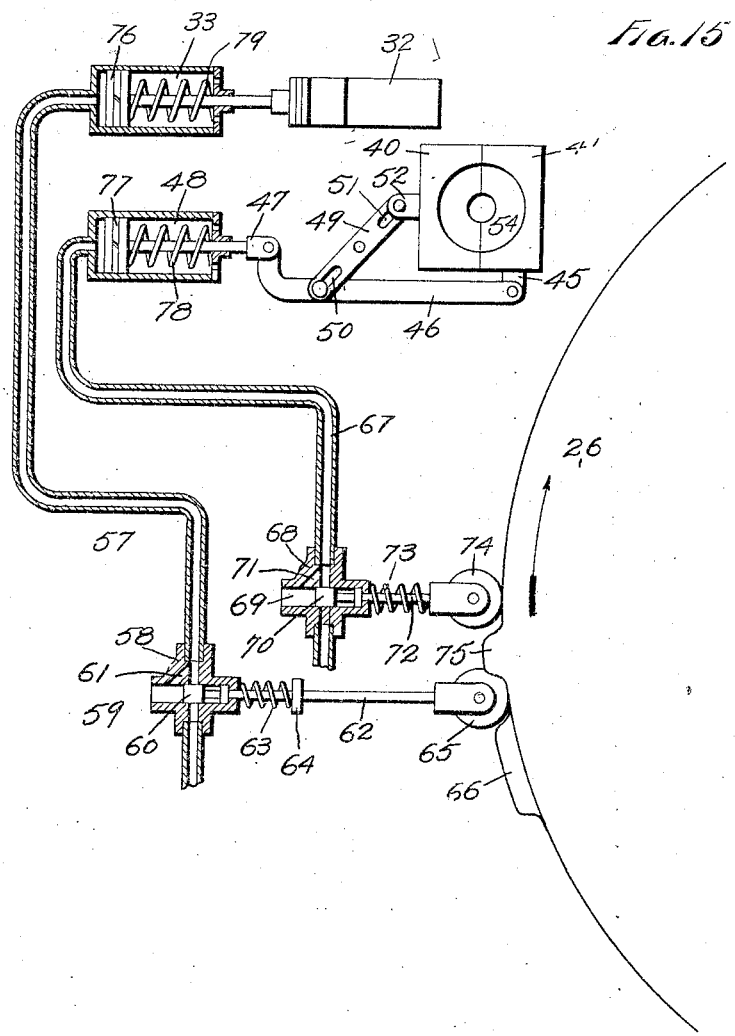

Patented Feb. 16, 1926.

1,573,636

UNITED STATES PATENT OFFICE.

LEO A. DREY, OF ST. LOUIS, MISSOURI, ASSIGNOR, BY MESNE ASSIGNMENTS, TO BALL BROTHERS COMPANY, OF MUNCIE, INDIANA, A CORPORATION OF INDIANA.

APPARATUS FOR FEEDING GLASS INTO MOLDS.

Application filed October 18, 1920. Serial No. 417,765.

*To all whom it may concern:*

Be it known that I, LEO A. DREY, a citizen of the United States, and resident of St. Louis and State of Missouri, have invented certain new and useful Improvements in the Apparatus for Feeding Glass into Molds, of which the following is a specification containing a full, clear, and exact description, reference being had to accompanying drawings, forming a part thereof.

This invention relates to improvements in the method of and apparatus for feeding glass into molds and has for its primary object the feeding of a constantly moving measured and shaped mass of glass into molds.

A further object is to construct an apparatus having a bottomless tapered cup in which the flow of molten glass is retarded sufficiently to allow the desired quantity of glass to accumulate in the cup and the mass of glass shaped before entering the mold.

A further object is to enlarge the severed end of a stream of glass after it issues from the furnace and utilizing the same as a constantly, slowly moving plastic bottom for a bottomless gathering and forming cup.

A still further object is to feed a constantly moving mass of molten glass into a mold, a sufficient quantity of glass having been gathered in a bottomless cup, the end of the stream of glass after it issues from the furnace having been enlarged sufficiently so that it will not pass directly through the cup but act as a slowly downward moving plastic bottom for the accumulating mass, thus allowing the cup to accumulate a sufficient quantity of glass for making the desired article before the stream is interrupted and the glass within the cup dropped into the mold.

Figure 1:
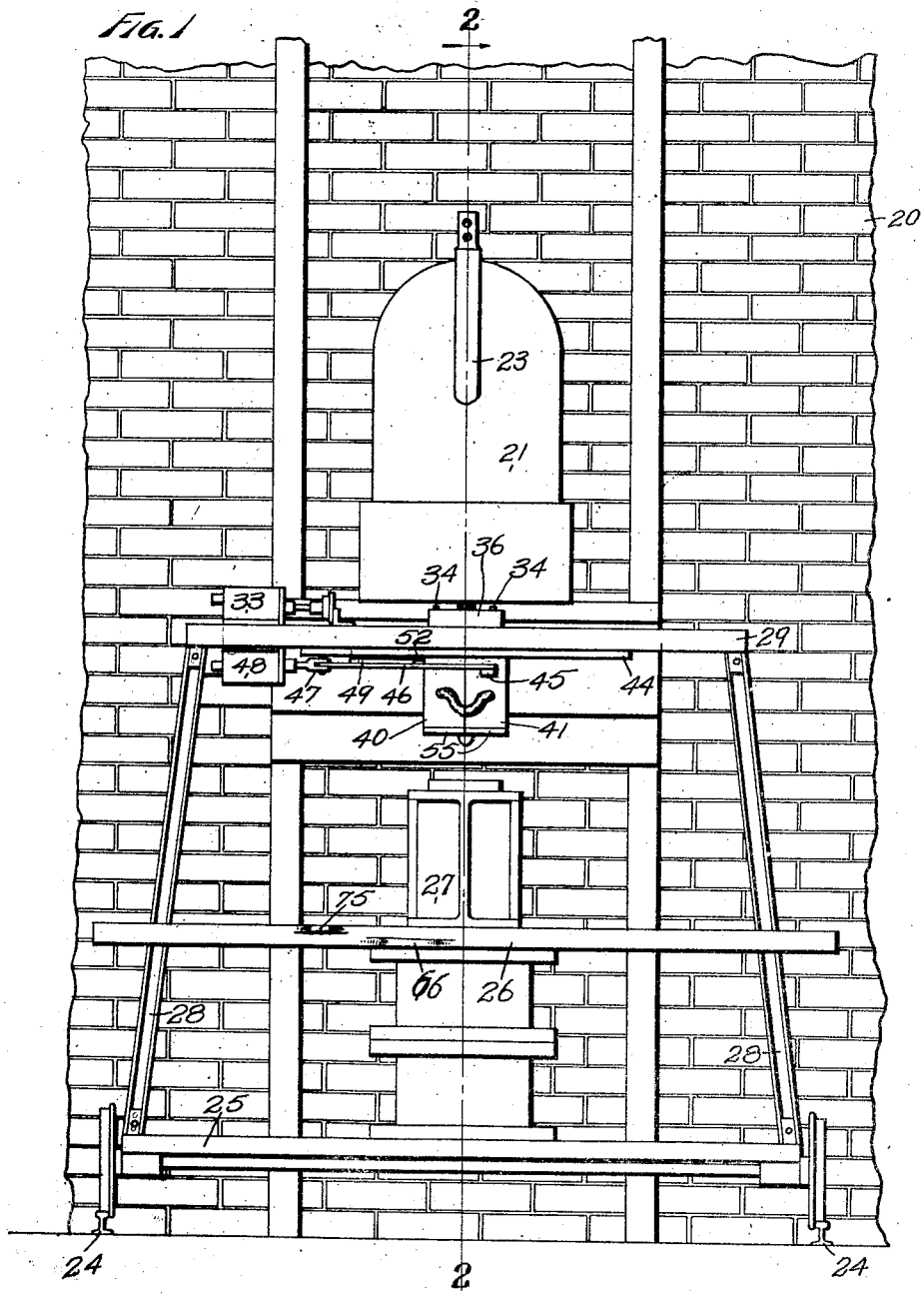
Fig. 1 is a front elevation of a portion of a glass furnace with my device in position.
Figure 2:
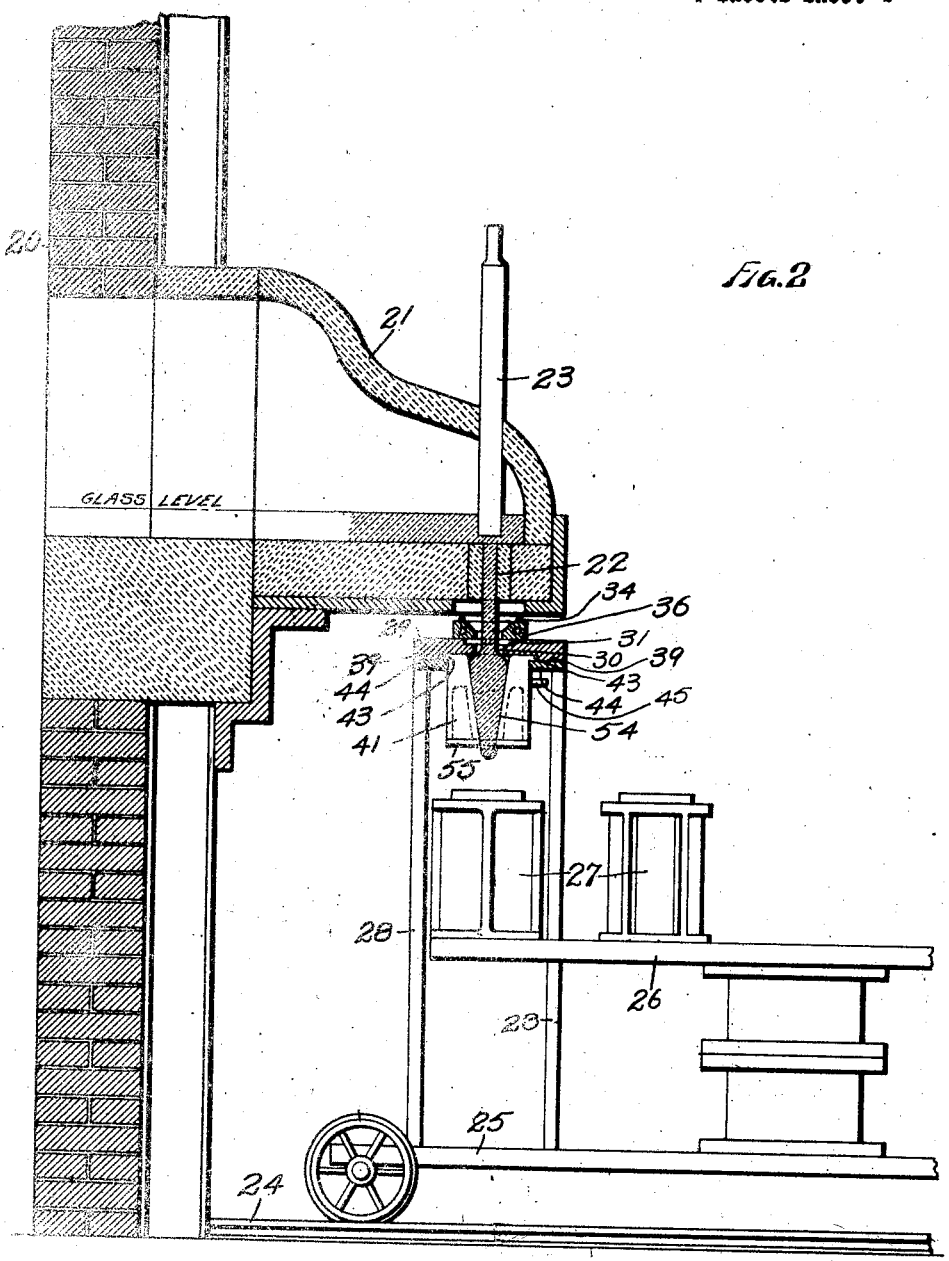
Fig. 2 is a vertical sectional view taken on the line 2—2 of Fig. 1.
Figure 3:
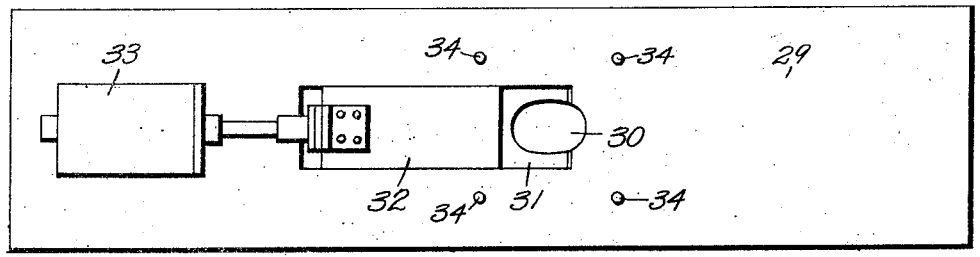
Fig. 3 is a top plan view of the supporting plate showing the severing knife and its means of operation.
Figure 4:
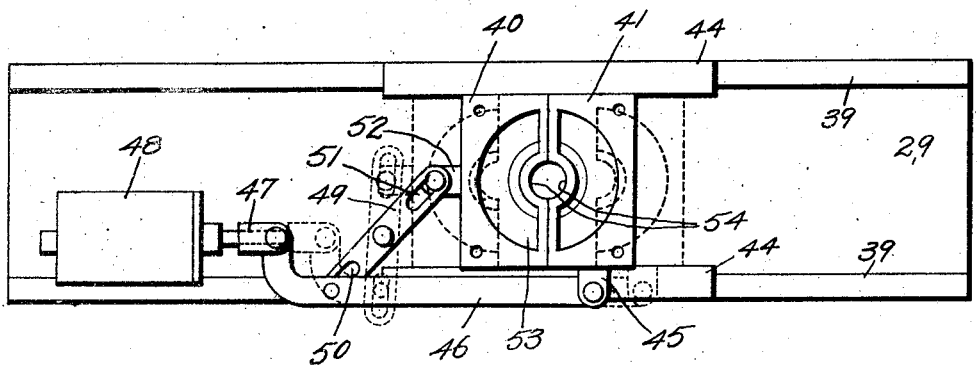
Fig. 4 is a bottom view of the supporting plate showing the gathering cup and the mechanism for operating the same.
Figure 6:
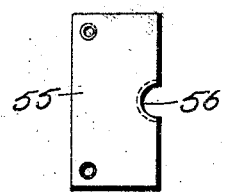

Fig. 6 a bottom plan view of one of the plates made use of in closing the water jacket.

Figures 7, 8:
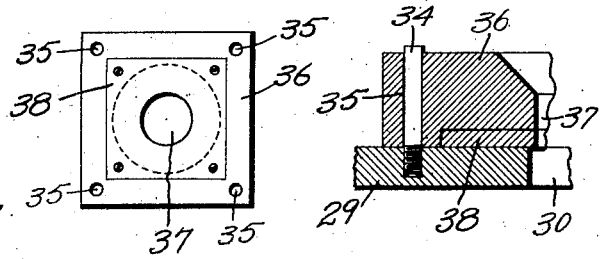
Figure 5:
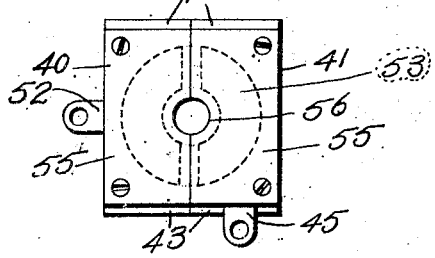
Fig. 5 is a bottom plan view of the gathering cup as assembled.

Fig. 7 a bottom plan view of the scraper plate which rests on the upper face of the knife.

Fig. 8 an enlarged section taken through one of the corners of the scraper plate showing the method by which vertical movement is allowed between it and the knife to compensate for wear.

Figs. 9, 10, 11, 12, 13 and 14 are sectional views showing the manner in which the several parts operate and the various forms assumed by the stream of glass as it passes from the furnace to the mold.

Fig. 15 is a diagrammatic view showing one means by which the movement of the severing knife and gathering cup is synchronized with the mold table.

In the construction of my device I employ a glass furnace 20. This is provided with the boot 21. This boot it provided with the opening 22 through which the molten glass flows. This flow of glass is regulated by means of a valve or plug 23. Secured to the floor and in front of the furnace are tracks 24 on which is mounted a frame 25. To this frame is secured the mold table 26 on which the blank molds 27 are located. This mold table is of ordinary construction and is rotated intermittently so as to bring one of the molds 27 successively and directly beneath the discharge opening 22 in the boot. Secured to the frame 25 are standards 28, to the upper end of which the supporting plate 29 is secured. This supporting plate is provided with an opening 30, which is located at approximately its center and directly beneath the opening 22. In the upper face of the plate 29 is formed a recess 31 which is adapted to receive the knife 32. The knife 32 is operated by means of the air cylinder 33 and the movement synchronized with the rotation of the mold table so that when one of the molds 27 comes to rest directly beneath the opening 22 air is admitted to the cylinder 33 and the knife 32 moved forward, thus closing the opening 30 and serving the stream. Projecting from the upper face of the plate 29 are pins 34. Theses pins project through openings 35 formed in the scraper plate 36 and allow the scraper plate free vertical movement. The purpose of this movement is to compensate for the wear on the bottom of the plate 36 and on the top of the knife, and also to allow for expansion so that the knife will not be jammed between the scraper plate and the supporting plate 29 after the knife has been used for some time and becomes heated through contact with the molten glass. The scraper plate is provided with an opening 37, which is also in alignment with the opening 22 in the boot. In the lower face of the scraper plate is secured a perforated plate 38. This plate is of hard steel and is so ground that the edges of the perforation which are in alignment with the opening 37 form a sharp edge, the purpose of this scraper plate is to form a shearing edge with the knife 32 when it moves forward or does the cutting and to assist in removing the molten glass from the knife when the same is withdrawn. The underside of the plate 29 is provided with longitudinal extending ribs 39 and between these ribs the gathering cup is secured. This cup is made of two halves 40 and 41. These halves are provided with extending tongues 43 along two opposite edges. These tongues 43 are of the same thickness as the ribs 39, and in order to hold the cup in position on the plate 39, the gibs 44 are used, thus forming a slide in which the tongues 43 move. The cup member 41 is provided on its side with an ear 45 in which one end of a link 46 is pivotally secured. The opposite end of the link being secured to the piston rod 47, which is mounted in the air cylinder 48. This air cylinder is also synchronized with the movement of the mold table so as to operate the cup when one of the molds is directly beneath the cup. Pivotally secured to the plate 29 is a lever 49. This lever is pivoted to the plate at its center and has its ends slotted as at 50 and 51. The slotted end 50 being secured to the lever 46 while the end 51 is secured to the ear 52, which is formed at the rear end of the cup member 40. The cup members 40 and 41 are provided with a circular recess 53 and also with a semi-circular tapered opening or wall 54, the recess 53 forming a portion of the water jacket. The lower end of this recess is closed by means of plates 55. These plates are each provided with a central semi-circular recess 56, which correspond in size to the lower part of the tapered opening 54 and securely seal the water jacket.

Attached to the air cylinder 33 is an air pipe 57. This air pipe is secured in an air valve 58 which has a central bore 59, and in this bore is located a plunger valve 60. The housing of the valve 58 is also provided with a by-pass 61. Attached to the valve 60 and projecting therefrom is a rod 62. This rod is surrounded by a coil spring 63, one end of which rests against the valve housing and the other against a collar 64. This spring has a tendency to keep the valve normally closed. On the projecting end of the rod 62 is mounted a roller 65, which is designed to come in contact with the cam surface 66 formed on the mold table 26. Attached to the air cylinder 48 is a pipe 67 which is attached to the valve housing 68. This valve housing is also provided with a central bore 69 in which is located the plunger valve 70; the housing is also provided with a by-pass 71. Secured to the plunger valve 70 and projecting through the housing 68 is a stem 72, which is surrounded with a coil spring 73. This coil spring serving the same purpose as the coil spring 63. Secured to the end of the stem or rod 72 is a roller 74, which is designed to contact with the cam surface 75 formed on the periphery of the mold table 26. As will be noted from the drawing, the roller 65 is permitted to pass underneath the cam surface 75; this is accomplished by locating the cam surfaces 66 and 75 in different vertical planes so that the roller 65 will pass under the cam surface 75, while the roller 74 will pass above the cam surface 66 as the mold table 26 is rotated, to bring the molds in alignment with the gathering cup. The cam surface or projection 66 will contact with the roller 65, the roller will ride up on the projection and force the rod 62 together with the valve 60 backward, thus allowing air to pass into the cylinder 33. This air will force the piston 76 forward and consequently force the knife 32 forward, which severs the stream. After the roller 65 has reached the top or periphery of the cam projection 66, the roller 74 rides upward on the cam projection 75, this will open the valve 70 and allow air to pass into the cylinder 48. This air will force the piston 77 forward and through the lever connections 46 and 49 the cup members 41 and 40 will be opened or forced apart.

It will be noted that the cam projection 75 is shorter than the projection 66. This will allow the roller 74 to leave the periphery of the projection 75, while the roller 65 is still in contact with the projection 66. As soon as the roller 74 is again in contact with the periphery of the mold table, the valve 70 is again closed. This closing uncovers the by-pass 71 and will allow the air to escape through the bore 69 and into the atmosphere. This forcing out of air is accomplished by means of the spring 78 interposed between the piston 77 and the head of the cylinder 48. The closing of this valve 70 is accomplished by the spring 73. The operation of the valve 58 is exactly the same. The spring 79 located in the cylinder 33 performing the same function as the spring 78. During the time that the valves 60 and 70 are open to air pressure they will close the by-passes 61 and 71, and when the valves are again closed by the springs 63 and 73 the by-passes are opened. Thus it will be seen that the movement of the knife 32 and cup members 41 and 40 are synchronized with the movement of the mold table 26, the knife, however, being operated forward first; that is, before the cup members are separated and held in this position until the cup members have again been brought into closed position. The number of cam projections 75 and 66 must of course correspond to the number of molds caried by the mold table 26.

It is obvious that various forms of mechanism can be used to synchronize the movement of the severing knife and gathering cup with the intermittent rotation of the mold table.

The operation of my device is as follows: After the glass has been melted in the furnace the valve 23 is adjusted so as to obtain the proper flow of glass. The frame 25 is then moved forward until the scraper plate 36 is directly beneath the discharge opening 22, the molten glass now flows directly through the cup and into one of the molds 27. Just before the table 26 is revolved to bring a new mold underneath the cup, the knife 32 is operated by the cylinder 33 and the stream of glass issuing from the furnace severed. As soon as the knife has reached its outer-most position or the end of the forward stroke, the cylinder 48 operates the cup members 40 and 41 through the lever mechanism and forces them apart. As soon as they have reached their outer-most point of travel, the cup members are again brought together—during this time the glass has been flowing on to the knife 32 and assumed the position shown in Fig. 9. As soon as the cups come together again, the knife 32 is withdrawn and the enlarged severed end of the stream allowed to enter the cup. It will then assume the position shown in Fig. 10 wherein the enlarged end of the stream can not pass directly through the bottom of the cup, but is supported by the sides thereof and must travel downward slowly. The glass continues to flow into the cup as shown in Figs. 11 and 12, the enlarged end of the stream continually traveling downward and forming a moving plastic bottom for the cup while the glass from the furnace enters the cup faster than the bottom travels downward. When a sufficient quantity of glass has accumulated in the cup, which is timed or synchronized with the movement of the mold table, the knife 32 is brought forward severing the stream issuing from the furnace, as in Fig. 13. When this severing has been accomplished, the cup again opens up, as in Fig. 14, and the mass accumulated in the cup is dropped into the mold positioned directly beneath it, after which the foregoing operation is repeated. It will be seen that by this construction of apparatus, the point A of the accumulated batch of glass at no time comes in contact with the gathering cup, but retains its heat which diffuses upwardly and tends to keep the entire mass heated to a higher degree than is possible where the measuring cup is closed at its bottom end.

Furthermore, the in-coming stream of glass from the furnace will also heat up this bottom part and remove any chill which may be imparted to it by its contact with the knife 32.

Another feature of having this glass hot and constantly moving is so the severed end B of the stream, which is below the knife, will be heated by this hot moving mass of glass and become absorbed in the glass, thus eliminating scars in the finished article.

It will be observed from the foregoing that the knife 32 is operated by the air cylinder 33 and is synchronized with the movement of the mold table, and likewise the opening and closing of the cup members 40 and 41 are operated by the air cylinder 48 and the connections described and are also synchronized with the movement of the mold table,—the knife moving forward and severing the stream and supporting it until the cup members have moved apart, discharged the accumulated batch and been brought in closed position again, then the knife is withdrawn. In other words, the movement of the knife and cup members are not simultaneous.

By my improved apparatus and method I am able to accumulate in a bottomless cup a sufficient amount of glass to make the desired article and also to shape the gathered mass. The gathered mass so accumulated is of uniform temperature throughout and is constantly moving during the entire period of accumulation. In other words, I accumulate and shape a sufficient amount of glass for the desired article while it is continually moving by retarding its rate of flow.

It will be further observed that I utilize the enlarged severed end of the stream as a bottom or support in accumulating the desired quantity of glass and which is always moving.

It will be further observed that the glass above the knife only contacts with the knife momentarily; that is during the time of opening and closing the cup members. This contacted portion is reheated, as it were, during its downward travel through the cup members by the on-coming glass. It will be further observed that the glass being severed above the gathering cup the shear marks will be absorbed by the accumulated mass during its descent into the molds.

It will be further noted that during the entire period of accumulating or gathering, the mass of glass is in motion and not at rest.

The mass of glass which I obtain by my apparatus and method may be defined as one having definite characteristics. In the first place, it is a mobile mass; it is a mass shaped to substantially conform to the blank mold; it has no shear markings to leave scars in the finished article. During its accumulation, it being always in motion, it will absorb heat more quickly from the on-coming stream and the heat will be diffused more uniformly throughout the entire mass.

In view of the fact that the mass, during its accumulation, is not brought to rest, no dense spots arising from supporting contact of the mass will be present, and therefore, the mobile preformed or shaped mass will be of uniform density throughout.

Another essential feature of my device is that the parting cup is fixed relative to the discharge opening in the boot to the opening in the scraper plate and in the plate 29. In other words, there is no horizontal movement, or in fact, any other movement given the cup, than the parting of its members when discharging the accumulated mass of glass.

Having fully described my invention, what I claim is:

1. In an apparatus for gathering molten glass from a continuously flowing stream, comprising a supporting plate provided with an opening through which the stream of glass passes, a knife slidably mounted on said plate and adapted to move over said opening for preventing the passage of glass therethrough, a scraper plate carried by said plate and located above said knife, a bottomless cup composed of separable members slidably secured to the underside of said plate and adapted to surround said opening, and means for periodically separating said members for dropping accumulated glass therefrom into the molds of a glass forming machine.

2. In an apparatus for gathering molten glass from a continuously flowing stream, comprising a supporting plate provided with an opening through which the oncoming stream of glass is adapted to pass, means located on said plate for intermittently closing said opening and severing said stream of glass, a scraper plate located above the severing means and provided with an opening therethrough for guiding the severed end of said stream, an open bottom gathering cup composed of separable members slidably secured on the underside of said supporting plate for receiving and gathering glass from said stream, and means for separating said cup members when the severing means has been operated for discharging accumulated glass in the cup into a mold.

3. In an apparatus for gathering molten glass from a continuously flowing stream, comprising a supporting plate having a central opening therethrough, said opening being concentric with the stream of glass, a recess formed in the upper face of said plate, a knife slidably located in said recess, means for operating said knife periodically across said opening for closing the same and severing the oncoming stream of glass, a bottomless cup composed of separable members slidably secured to the underside of said supporting plate, and means for moving said separable members to and from each other when the opening in the supporting plate is closed.

4. In an apparatus for gathering molten glass from a continuously flowing stream, comprising a supporting plate provided with a recess in its upper face and with a central opening concentric with the stream of glass, a knife slidably located in said recess, means for periodically operating said knife across said opening for closing the same and severing the oncoming stream, a scraper plate located above the knife, said plate adapted to confine the severed end of the stream above the opening in the supporting plate, a bottomless cup composed of separable members slidably secured to the underside of the supporting plate and surrounding the opening therethrough, and means for moving said separable members from each other for discharging the accumulated glass in said cup during the time that the opening in the supporting plate is closed.

5. In an apparatus for gathering molten glass from a continuously flowing stream, comprising a carriage, a supporting plate provided with a recess in its upper face and with an opening therethrough carried thereby, a knife slidably located in said recess, means for operating said knife periodically across said opening for closing the same and simultaneously severing and supporting the oncoming stream of glass, a bottomless cup composed of a pair of members slidably secured to the underside of said supporting plate and surrounding said opening, and means for moving said separable members to and from each other when the opening in the supporting plate is closed whereby molten glass accumulated in the cup is discharged into the mold of a glass forming machine.

6. In an apparatus for gathering molten glass from a glass forming machine, comprising a supporting plate having a central opening therethrough and having a recess formed in its upper face, said opening being concentric with the oncoming stream of glass, a knife slidably located in the said recess, a scraper plate carried by the supporting plate and located above the knife, said scraper plate provided with a central opening adapted to confine the severed end of the stream above the opening in the supporting plate, a bottomless cup composed of separable members slidably secured to the underside of said supporting plate and surrounding the opening therein, and means for automatically operating said knife and said gathering cup at predetermined intervals whereby the oncoming stream is severed and supported, and the accumulated glass in the cup discharged into the molds of a glass forming machine.

In testimony whereof, I have signed my name to this specification.

LEO A. DREY.